United States Patent [19]

Joyal

[11] Patent Number: 4,984,746
[45] Date of Patent: Jan. 15, 1991

[54] UNDER CARRIAGE SPRAYER FOR AUTOMOBILES OR THE LIKE

[75] Inventor: George L. Joyal, St. Malo, Canada

[73] Assignee: George Enterprise Ltd., St. Malo, Canada

[21] Appl. No.: 295,451

[22] Filed: Jan. 10, 1989

[30] Foreign Application Priority Data

Jan. 13, 1988 [CA] Canada ................................. 556469

[51] Int. Cl.⁵ .............................................. B08B 3/00
[52] U.S. Cl. ................................... 239/722; 239/754; 239/588; 134/123
[58] Field of Search ............... 239/754, 588, 286, 722; 134/45, 123, 172, 198; 280/47, 34

[56] References Cited

U.S. PATENT DOCUMENTS

| 964,178 | 7/1910 | Opitz et al. | |
|---|---|---|---|
| 1,129,713 | 2/1915 | Nikola | 239/588 X |
| 1,219,049 | 3/1917 | Sticklin | 239/588 |
| 1,586,294 | 5/1926 | Deming . | |
| 1,724,702 | 8/1929 | Flickinger . | |
| 2,761,732 | 9/1956 | Anthon . | |
| 2,820,642 | 1/1958 | Harper | 280/47.34 X |
| 3,120,327 | 2/1964 | Lang | 239/588 X |
| 3,134,461 | 5/1964 | Klemm et al. | 280/47.34 X |
| 3,652,014 | 3/1972 | Neville | 239/754 |
| 3,795,254 | 3/1974 | Blosser | 134/123 |
| 3,931,931 | 1/1976 | Otis | 239/754 |
| 4,203,609 | 5/1980 | Mitchell et al. | 280/47.34 X |
| 4,580,726 | 4/1986 | Unger | 239/286 |

FOREIGN PATENT DOCUMENTS

| 831956 | 2/1952 | Fed. Rep. of Germany | 134/123 |
|---|---|---|---|
| 39951 | 4/1987 | Poland | 134/123 |

Primary Examiner—Andres Kashnikow
Assistant Examiner—Kevin P. Weldon
Attorney, Agent, or Firm—Murray E. Thrift; Stanley G. Ade; Adrian D. Battison

[57] ABSTRACT

An undercarriage sprayer is provided for automobiles and the like. The sprayer has a T-shaped frame with a castor wheel at the base of the T and two steerable wheels at the ends of the cross bar. A handle connected to the frame at the intersection of the T is used to manipulate the sprayer and to steer the wheels through the use of a rotating hand grip. Spray nozzles are spaced along the base arm of the T-frame and may be arranged to pivot from side to side under the control of an operator. In other embodiments, the nozzles may be rotating spray heads.

14 Claims, 3 Drawing Sheets

UNDER CARRIAGE SPRAYER FOR AUTOMOBILES OR THE LIKE

FIELD OF THE INVENTION

The present invention relates to sprayers for automobiles and the like and more particularly to an under carriage sprayer for such vehicles.

BACKGROUND

It is often desirable when washing a vehicle to clean the under carriage of the vehicle. This is of particular importance where the vehicle has been used in a corrosive environment, such as where salt has been used to melt ice and hard packed snow. In self service car washes, this under car washing must be done with the spray wand which is used for washing the rest of the car body. However, it is difficult, especially with a low vehicle, to wash the complete under side of the vehicle in a completely satisfactory manner using such a wand.

In addition, it is often desirable to spray the underside of a vehicle with a rust-inhibiting composition. A device that has been proposed for under car washing is described in U.S. Pat. No. 4,580,726 issued Apr. 8, 1986 to Michel J. Unger. In that device, two widely spaced vertically oriented nozzles are carried on a rectangular housing supported on two caster wheels. The nozzles are supplied with water through a hollow handle connected to the housing. The handle has a flexible section or is itself flexible so that the housing can be positioned as desired under a vehicle.

The present invention is concerned with certain improvements in a device of this sort.

SUMMARY

According to one aspect of the present invention there is provided an under carriage sprayer for automobiles or the like comprising:
a frame;
wheels supporting said frame for movement over a floor;
at least one spray nozzle mounted on said frame for directing a spray of liquid therefrom;
means for connecting a supply of liquid to said spray nozzle;
a handle connected to said frame for moving the frame over the floor; and
means associated with said handle for varying the orientation of the nozzle when in use.

The sprayer may be rolled under the vehicle by an operator in a standing position, and may be used to spray the complete under side of the vehicle. The orientation of the nozzle allows complete spray access to areas that cannot be reached with a fixed orientation nozzle, for example in the wheel wells. These areas are especially critical in order to prevent rusting of a vehicle body.

According to another aspect of the present invention there is provided an under carriage sprayer for automobiles or the like comprising:
a frame;
at least one spray nozzle mounted on the frame for directing a spray of liquid in an upwards direction;
wheels mounted on said frame for supporting the frame for movement over a floor;
steering means connected to at least one of said wheels for turning the at least one wheel about a substantially vertical axis so as to steer the frame for controlled movement over the floor;
a handle connected to the frame and to the steering means for moving and steering the frame.

The steering function allows convenient positioning of the nozzles at any desired location.

In preferred embodiments of the invention, the sprayer is generally T-shaped, with steering wheels at the ends of the cross bar, near the handle, so that the sprayer may be maneuvered around the wheels of the vehicle to spray up into wheel wells. It is also preferred that the sprayer contain a row of nozzles, say three, to provide a large spraying area. The orientation of the nozzles can preferably be adjusted by the operator during use. In one particularly advantageous embodiment of the invention, the nozzles are adjusted and the steering is effected by rotating the hand grip on the handle.

BRIEF DESCRIPTION OF THE DRAWINGS

In the accompanying drawings, which illustrate exemplary embodiments of the present invention.

DETAILED DESCRIPTION

Figure 1:
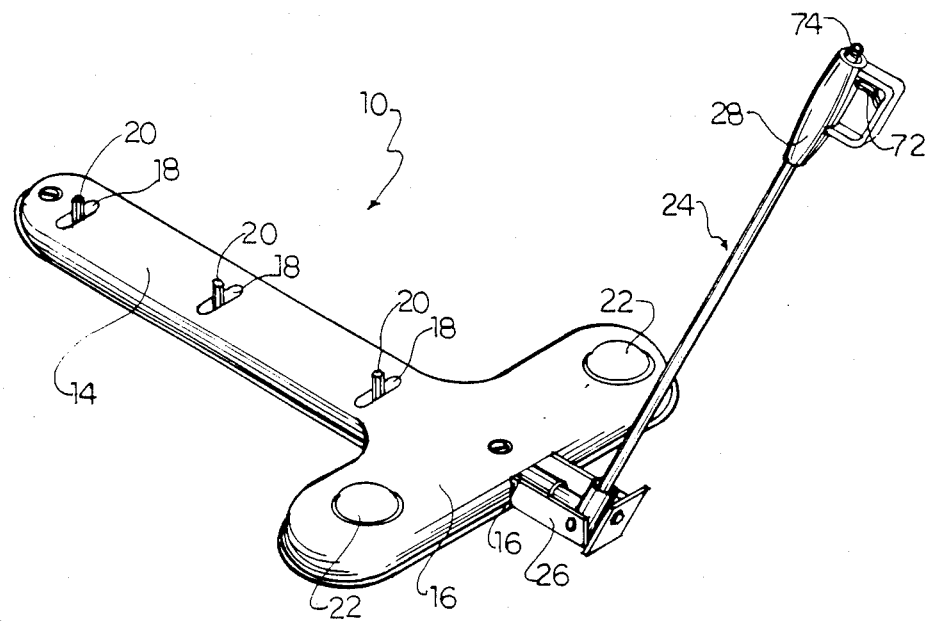
FIG. 1 is an isometric view of a sprayer according to the present invention.
Figure 2:
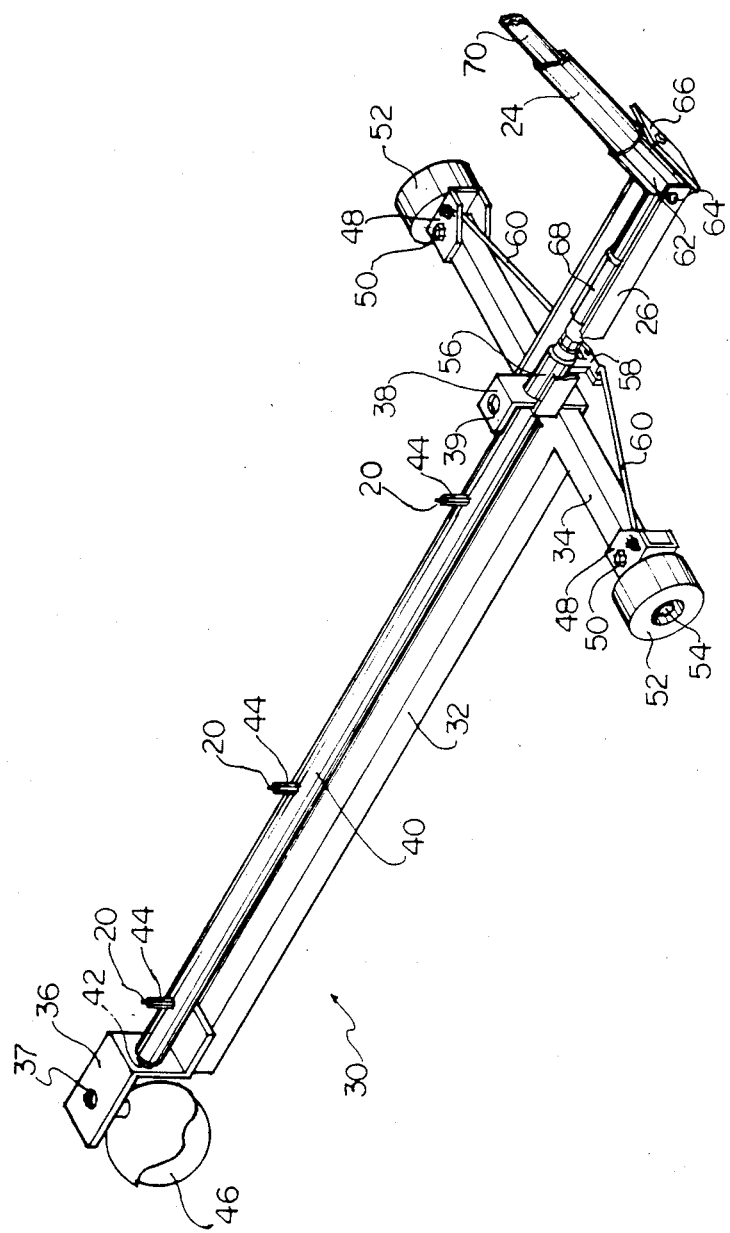
FIG. 2 is a view like FIG. 1 showing the sprayer with the housing removed.

Referring to the accompanying drawings, and especially to FIGS. 1 and 2, there is illustrated an under carriage sprayer 10 with a T-shaped casing 12 consisting of an elongate base arm 14 and a cross bar 16. Three lateral slots 18 are formed in the base arm 14, with spray nozzles 20 projecting through the slots to spray a washing or other liquid upwards from the sprayer 10. At the ends of the cross bar 16 are two convex, circular mirrors 22 that assist in viewing the underside of a vehicle as it is being sprayed.

A handle 24 is pivotally connected to the center of the cross bar 16 of the sprayer by a bracket 26. At the free end of the handle 24 is hand grip 28 that is used for manipulating and operating the sprayer.

As illustrated most particularly in FIG. 2, the sprayer has a frame 30 that is also T-shaped with a base beam 32 and a cross bar 34. At the outermost end of the beam 32 is a Z-bracket 36 with one flange secured to the beam 32 and another located above the beam to support the casing 12. The upper flange of the bracket has a threaded bore 37 which receives a screw 35 (FIG. 1) for holding the casing in place. At the center of the cross bar 34 is another bracket 38 that is of channel shape, with one flange lying beneath the beam 32 and bar 34, and the other generally co-planar with the top flange of bracket 36. The bracket 38 also has a threaded bore 39, to receive another machine screw 35 which secures the casing in place on bracket 38.

An elongate spray conduit 40 has a closed end adjacent the bracket 36 and secured to the vertical web of that bracket by an axle fitting 42. The opposite end of the spray conduit passes through an appropriately sized bore in the webs of brackets 26 and 38, where they overlap. The conduit carries three nozzle fittings 44 that accommodate the nozzles 20.

A castor wheel 46 is mounted on the front bracket 36, beneath the upper flange, to support the front end of the sprayer frame off the ground. At the ends of cross bar 34 are two wheel brackets 48. These are channel sections fitted over the ends of the cross cross bar and pivoted to it by respective vertical bolts 50. A wheel 52 is secured to each wheel bracket 48 by an axle bolt 54 that allows the wheel to rotate freely about the horizontal axis of the bolt. The two wheels 52 and the castor wheel 46 thus provide a three point wheel support for the frame 30.

Near its end outside of bracket 38, the spray conduit 40 carries a collar 56. The collar is fixed to the spray arm and carries a radially extending steering arm 58. The arm 58 is linked to the two wheel brackets 48 by respective steering rods 60. Each rod has bent ends that fit into respective bores in the steering arm and the associated wheel bracket. Appropriate retainers secure the rod ends in place, for example cotter pins or spring clips. The arrangement is such that as the spray conduit 40 rotates, the collar 56 and steering arm 58 will also rotate, thus turning the wheels 52 about their vertical axes, to allow steering of the sprayer.

The handle 24 is equipped with a collar 62 at its bottom end. The collar is mounted between the arms of the U-shaped bracket 26 by a pair of screws 64, so that the handle can pivot about a substantially horizontal axis perpendicular to the axis of rotation of the spray conduit 40. A flat plate 66 is bolted to the outer face of the collar 62 and is so arranged that when the the handle 24 is in a horizontal orientation, the plate 66 will engage the bottom face of the bracket 26 to prevent further downwards rotation of the handle.

A hose coupling 68 is fitted to the end of the spray conduit 40 and to a hose 70 that extends through the handle 24 to the hand grip 28. The hand grip contains a valve (not shown) operated by a trigger 72. The end of the hand grip carries a hose fitting 74 for connection to a pressure hose for receiving a supply of washing liquid.

In operation of the sprayer 10, the hose fitting 74 is connected by a conventional hose (not shown) to a source of water or other liquid, for example a detergent solution or a rust-inhibiting liquid. The sprayer is then rolled under the vehicle to be sprayed and, when properly positioned, the trigger is pulled to cause the pressurized washing liquid to pass through the valve in the hand grip, through the hose 70 along the handle and into the spray conduit 40. The liquid is then sprayed through nozzles 20 onto the under side of the vehicle. The orientation of the nozzles 20 may be altered by rotating the hand grip 28, which rotates the hose 70 and through it the spray conduit 40. That section of the hose between the handle 24 and the hose coupling 68 serves as a flexible universal joint. The torsional rigidity of the hose is sufficient to provide the desired rotational motion. To move the sprayer from place to place under the vehicle, the hand grip may be used to steer the vehicle by steering the wheels 52.

Figure 3:
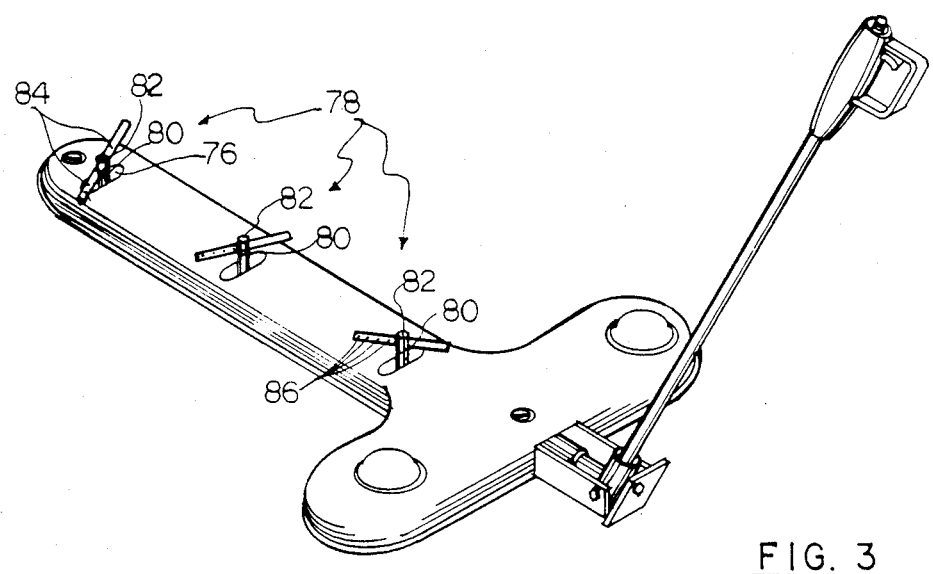
FIG. 3 is an isometric view of an alternative embodiment of the sprayer.

An alterative embodiment of the invention is illustrated in FIG. 3 where the sprayer 76 is shown as having rotary spray heads 78 rather than the fixed, selectively oriented nozzles 20. Each rotary head includes an upright tube 80 surmounted by a rotary cap 82 and two radial spray arms 84. Each arm has a series of orifices 86 spaced along it, with each orifice positioned between a vertical and a horizontal position, so that liquid sprayed from the nozzle has both a vertical and a horizontal component and causes the spray arms and their associated caps 82 to rotate about the respective tubes 80. This embodiment of the sprayer is especially intended for use with larger vehicles, such as trucks. An embodiment for use with trucks may also be mounted higher off the ground than those illustrated so that the nozzle is closer to the under surface of the vehicle.

Figure 4:
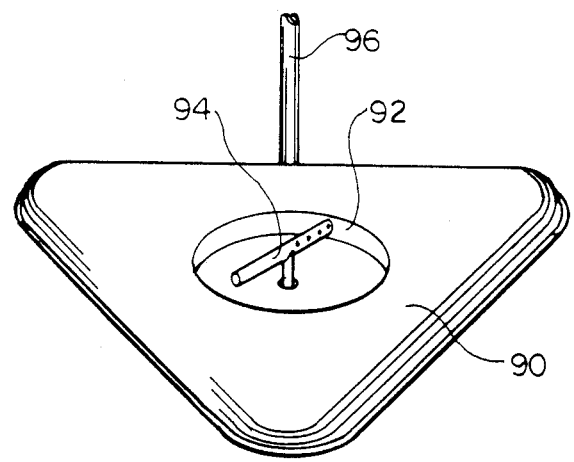
FIG. 4 is an isometric view of a further embodiment of the sprayer.

Another embodiment of the sprayer is illustrated in FIG. 4, where the overall shape of the casing 90 is triangular. A circular well 92 in the centre of the casing accommodates a rotating spray head 94, like those used in the FIG. 3 embodiment. The sprayer has three support wheels (not shown) at the corners of the casing, two of which are steered by rotation of the handle 96. The recessed spray head is protected against impact with the underside of a vehicle. This embodiment is a relatively small size, is suitable for domestic use, fed from a common garden hose.

While specific embodiments of the invention have been described in the foregoing, it is to be understood that other embodiments are possible within the scope of the invention. For example, the sprayer may be steered using a single wheel such as that at the base of the T-frame. The wheel steering and spray directing functions may also be separated if desired. The invention is therefore to be construed a limited solely by the scope of the appended claims.

I claim:

1. An under carriage sprayer for automobiles or the like comprising:
   a frame;
   wheels supporting said frame for movement over a floor;
   spraying means comprising at least one spray nozzle mounted on said frame for directing a spray of liquid upwardly therefrom;
   means for connecting a supply of washing liquid to said spraying means;
   a handle connected to said frame for moving the frame over the floor;
   means associated with said handle for selectively varying the orientation of the nozzle with respect to the frame when in use; and
   steering means for controllably turning at least one of said wheels so as to steer the frame over the floor.

2. A sprayer according to claim 1 including plural nozzles.

3. A sprayer according to claim 1 wherein said spraying means includes a spray arm with plural spray orifices.

4. A sprayer according to claim 3 wherein each spray arm is rotatable about a generally upright axis.

5. A sprayer according to claim 4 wherein each spray arm has outlet orifices oriented at an angle to the axis such that spraying liquid from the orifices causes rotation of the nozzle about the axis.

6. An under carriage sprayer for automobiles or the like:
   a frame;
   a plurality of wheels supporting the frame for movement over a floor;
   an elongate spray conduit mounted on said frame for rotation about a longitudinal axis;
   a plurality of nozzles spaced along said conduit for spraying liquid from the conduit in a direction determined by the rotational position of the conduit;
   a handle;
   means connecting the handle to the frame adjacent one end of the conduit for moving the frame over the floor by manipulation of the handle; and means on the handle for rotating the conduit.

7. A sprayer according to claim 6 wherein the handle includes a hand grip rotatable about an elongate handle axis and coupling means joining the hand grip to the conduit for rotating the conduit in response to rotation of the hand grip.

8. A sprayer according to claim 7 wherein the coupling means comprise a hose extending the length of the handle and having one end connected to the hand grip and the other end connected to the conduit.

9. A sprayer according to claim 8 wherein the handle is pivotable about an axis substantially perpendicular to the spray conduit.

10. A sprayer according to claim 6 wherein the frame comprises a base component and a cross bar component connected in a T shape, with the handle connected to the frame adjacent the intersection of the base and cross bar components.

11. A sprayer according to claim 10 including a castor wheel secured to the base component of the frame and two further wheels at the ends of the cross bar component of the frame.

12. An under carriage sprayer for automobiles or the like comprising:
   a frame including a base component and a cross bar component connected in a T shape;
   a plurality of wheels supporting the frame for movement over a floor, including a castor wheel secured to the base component of the frame and two further wheels at the ends of the cross bar component of the frame;
   an elongate spray conduit mounted on said frame for rotation about a longitudinal axis;
   a plurality of nozzles spaced along the conduit for spraying liquid from the conduit in a direction determined by the rotational position of the conduit;
   a handle connected to the frame for moving the frame over the floor and including means for selectively rotating the conduit; and
   a steering linkage connecting the handle to the further wheels such that selected movement of the handle rotates the further wheels about respective vertical axes with respect to the frame.

13. A sprayer according to claim 12 wherein the steering linkage turns the further wheels in response to rotation of a hand grip on the handle.

14. An under carriage sprayer for automobiles or the like comprising:
   a frame;
   a plurality of wheels supporting the frame for movement over a floor;
   an elongate spray conduit mounted on the frame for rotation about a longitudinal axis;
   a plurality of nozzles spaced along the conduit for spraying liquid from the conduit in a direction determined by the rotational position of the conduit;
   a handle connected to the frame for moving the frame over the floor, the handle including a hand grip rotatable about an elongate handle axis;
   coupling means joining the hand grip to the conduit for rotating the conduit in response to rotation of the hand grip; and
   wheel steering means connected to said conduit for steering the frame to one side or the other in response to rotation of the conduit.

* * * * *